United States Patent Office.

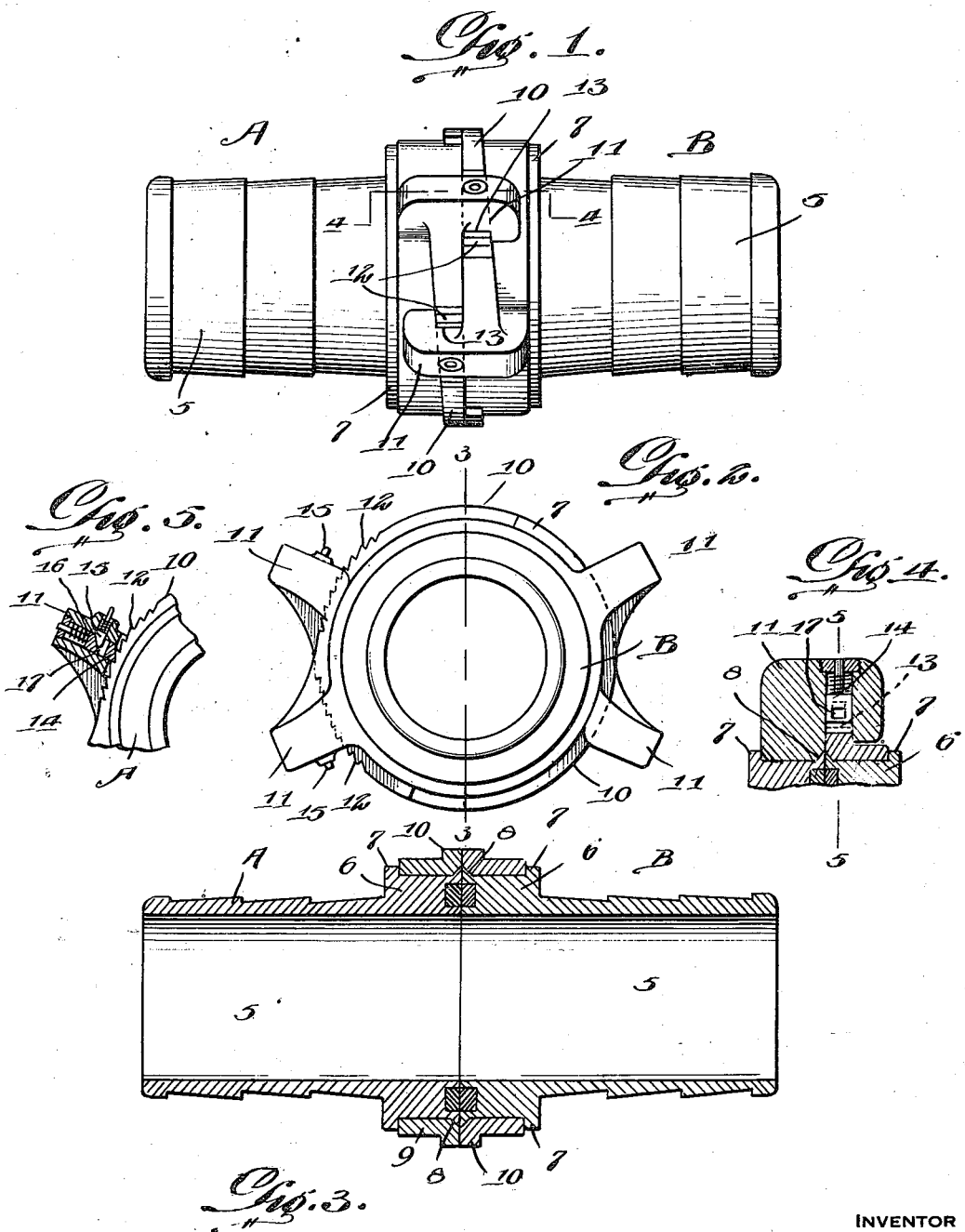

WILLIAM G. WILSON, OF WEST BRIGHTON, NEW YORK.

HOSE-COUPLING.

1,317,535. Specification of Letters Patent. Patented Sept. 30, 1919.

Application filed May 19, 1917, Serial No. 169,723. Renewed August 22, 1919. Serial No. 319,247.

*To all whom it may concern:*

Be it known that I, WILLIAM G. WILSON, a citizen of the United States, residing at West Brighton, in the county of Richmond, Staten Island, New York, have invented new and useful Improvements in Hose-Couplings, of which the following is a specification.

The present invention relates to means for easily and quickly connecting two sections of hose to insure a water tight joint therebetween.

In carrying out my invention it is my purpose to produce a hose coupler comprising two similar members each having its outer end provided with an outstanding rib having an offset notched finger, the ribs gradually decreasing in width from the fingers to the ends of the said ribs, and the notch of one of the fingers designed to engage with the rib of the co-acting coupler members, means being provided between said fingers and ribs for locking the members connected, while releasing means is also provided to permit of the unlocking and the separation of the said members.

It is also my purpose to produce a coupling for hose sections comprising two similar constructed tubular members designed to have their ends brought into contacting engagement and to be turned in opposite directions to bring the co-engaging elements upon said members into interlocking engagement whereby to quickly and effectively connect the coupler members.

It is also my purpose to provide means for easily and quickly coupling hose sections which shall be of a simple construction, cheap to manufacture and thoroughly effective in operation.

With the above and other objects in view the improvement resides in the construction, combination and arrangement of parts set forth in the following specification and falling within the scope of the appended claims.

In the drawing:

Figure 1 is a plan view illustrating the members of a hose coupler constructed in accordance with the present invention in their locked position, Fig. 2 is an end elevation of the same, Fig. 3 is a central longitudinal sectional view approximately on the line 3—3 of Fig. 2, Fig. 4 is a detail sectional view approximately on the line 4—4 of Fig. 1, and Fig. 5 is an enlarged sectional view approximately on the line 5—5 of Fig. 4.

As each of the members comprising my improved coupler is of a similar construction, the reference characters indicating the several elements comprising one of said members may be understood as equally applicable to the other member, the members, however, for distinction being indicated by the characters A and B.

Each of the members comprises a tubular body 5 having its outer face formed with the usual spaced ribs or shoulders and the inclined surfaces between the said ribs or shoulders, whereby to effectively engage with the hose when the said couplers are inserted in the ends of the said hose.

Each of the members 5 has its outer end provided with an annular enlargement which, for the sake of convenience, I will term a head and indicate the same by the numeral 6. The head 6 upon both its outer and inner edges is formed with outstanding flanges 7 and 8 respectively, the flange 8 which is upon the outer end of the head, is formed by providing the said head with a reduced extension which is substantially V-shaped in cross section, the said extension being bent outwardly of the said head 6, providing the outer edge of the said head with a substantially V-shaped flange as clearly illustrated in Fig. 3 of the drawing. Between the flanges 7 and 8 is arranged a flat ring member 9, the said ring being positioned upon the head previous to the bending of the flange 8, and the said ring has its inner corner upon its outer end beveled to receive the inner inclined face of the flange 8. The ring 9 upon the outer edge thereof is formed with a pair of spaced outstanding ribs 10—10 and also with fingers 11 that are arranged at a right angle with respect to the ribs. The ribs 10 terminate one with each of the fingers 11, and the said ribs gradually increase in width upon the inner faces of the said ribs from the outer ends of the ribs to their juncture with the fingers 11, as clearly illustrated in Fig. 1 of the drawing. The ribs 10 upon the outer faces thereof are provided with transverse notches or depressions 12, and the fingers 11 project a suitable distance beyond the end of the coupler member, as clearly illustrated in Figs. 1 and 4 of the drawing.

The extending portions of the fingers 11 have their underfaces notched, as at 13, and the outer wall provided by the said notch is inclined or arranged at an angle with respect to the inner wall provided by the said notch, so that when the heads of the coupler members are brought together and the projecting portions of the fingers are permitted to pass through the space between the fingers and the ends of the ribs upon the respective rings and turned in opposite directions, so that the notches 13 of the fingers of one of the rings will engage with the ribs of the confronting ring, a wedging or binding action will be effected between the angular walls provided by the notches of the fingers and the angular sides of the ribs.

One or both of the fingers 11 is provided with a spring pressed dog 14 that is designed to co-engage with the teeth or notches 12 upon the ribs 10, to effect in locking the coupler members associated. Upon the fingers provided with the said dogs are also arranged releasing means for the dogs, the same in the construction illustrated by the drawings being in the nature of spring pressed button members 15, the shanks 16 of the same being beveled upon one of the sides thereof, the said beveled end being received in a slot 17 in the respective dogs 14. The slot 17 is elongated so that the beveled end of the shank may be at all times received therein without interfering with the ratcheting of the dog over the teeth or notches in the ribs 11, but it will be noted that an inward pressure upon the bottom 15 will cause the beveled end of its shank to elevate the dog 14 against the pressure of its spring and consequently bring the engaging face of the dog out of contact with the teeth or depressions 12.

Also in order to positively insure a water tight joint between the coupler members A and B, I provide the outer end of each of the heads 6 with a circumferential groove 18 within which is seated a compressible gasket 19, and the contacting engagement of these gaskets will effectively prevent the passage of water between the heads when the coupler members are associated.

Having thus described the invention, what I claim is:

1. In combination with a coupler for hose sections, comprising two headed tubular members, revoluble rings upon the heads of the said members, outstanding toothed ribs upon the outer edge of the said rings, outstanding notched fingers upon the ribs designed to engage with the respective ribs of the coupler members when the same are brought to aline and the rings are turned in opposite directions; of spring means associated with the fingers designed to engage between the teeth of the ribs to lock the fingers upon the rings, and means arranged transversely with respect to the locking means and designed, when forced in the direction of the locking means to press upon the same and by virtue of such pressure to move the locking means to releasing position.

2. In combination with a coupler for hose sections, comprising two tubular members having headed ends, a ring revoluble on each of said heads, upstruck toothed ribs upon each of said rings, and notched fingers upon the rings designed to engage with the respective ribs of the coupler members; of a spring pressed dog arranged longitudinally in each of the fingers designed to engage with the teeth of the rib over which the finger is arranged, each of said dogs having a slot therein, the outer end wall of which is beveled, a spring pressed button member arranged in the side of each of the fingers and having a shank received in the slot of the respective dogs, and said shanks having each a beveled face to co-engage with the beveled wall of the slot, whereby an inward pressure upon said buttons will cause the inclined surface of the shank thereof, to move over the inclined wall in the slot of the dog to raise the dog out of engagement with the teeth of the ribs.

In testimony whereof I affix my signature.

WILLIAM G. WILSON.